(12) United States Patent  
Peng et al.

(10) Patent No.: US 8,749,770 B2
(45) Date of Patent: Jun. 10, 2014

(54) LENS MODULE TESTING DEVICE

(71) Applicants: Shu-Sheng Peng, Shenzhen (CN); Yong Li, Shenzhen (CN)

(72) Inventors: Shu-Sheng Peng, Shenzhen (CN); Yong Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 15 days.

(21) Appl. No.: 13/661,035

(22) Filed: Oct. 26, 2012

(65) Prior Publication Data
US 2013/0278924 A1   Oct. 24, 2013

(30) Foreign Application Priority Data

Apr. 20, 2012 (CN) .......................... 2012 1 0116814

(51) Int. Cl.
*G01B 9/00* (2006.01)
(52) U.S. Cl.
USPC .......................................................... 356/124

(58) Field of Classification Search
USPC .......................................................... 356/124
See application file for complete search history.

(56) References Cited

U.S. PATENT DOCUMENTS 7,433,027 B2 * 10/2008 Hall .............................. 356/124

* cited by examiner

*Primary Examiner* — Roy M Punnoose
(74) *Attorney, Agent, or Firm* — Novak Druce Connolly Bove + Quigg LLP

(57) ABSTRACT

A lens module testing device includes a base substrate, a supporting assembly, a bearing assembly, a receiving element, and an operation element. The supporting assembly is positioned on the base substrate and includes two supporting plates parallel with each other. One of the supporting plates defines an arc shaped slot. The bearing assembly is rotatably received between the two supporting plates. The receiving element is positioned on the bearing assembly and configured for receiving a lens module. The operation element penetrates the slot and connects to the bearing assembly; the bearing assembly is driven by the operation element to move along the slot and thereby adjusting the angle of the lens module which is presented to a light source.

10 Claims, 4 Drawing Sheets

LENS MODULE TESTING DEVICE

BACKGROUND

1. Technical Field

The present disclosure relates to testing devices and, particularly, to a lens module testing device capable of accurately adjusting a testing angle.

2. Description of Related Art

In a flare test of related art, a lens module is placed in a dark room and a light source is provided in the room. The lens module is manually rotated to capture images of the light source from desired angles. However, it is difficult to accurately rotate the lens module to the desired angles, which may result in inaccurate results of the test.

Therefore, it is desirable to provide a lens module testing device, which can overcome the limitations described.

DETAILED DESCRIPTION

Embodiments of the disclosure will be described with reference to the drawings.

Figure 1:
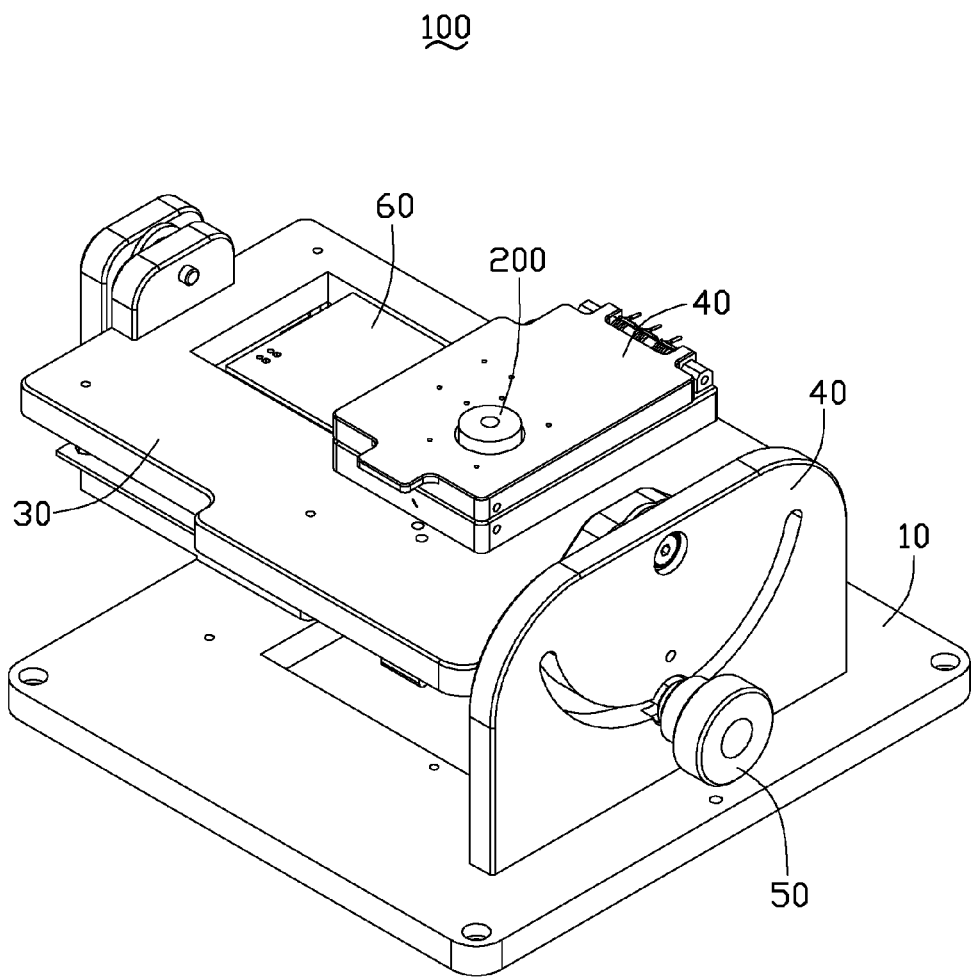
FIG. 1 is an assembled view of a lens module testing device in accordance with an exemplary embodiment.
Figure 2:
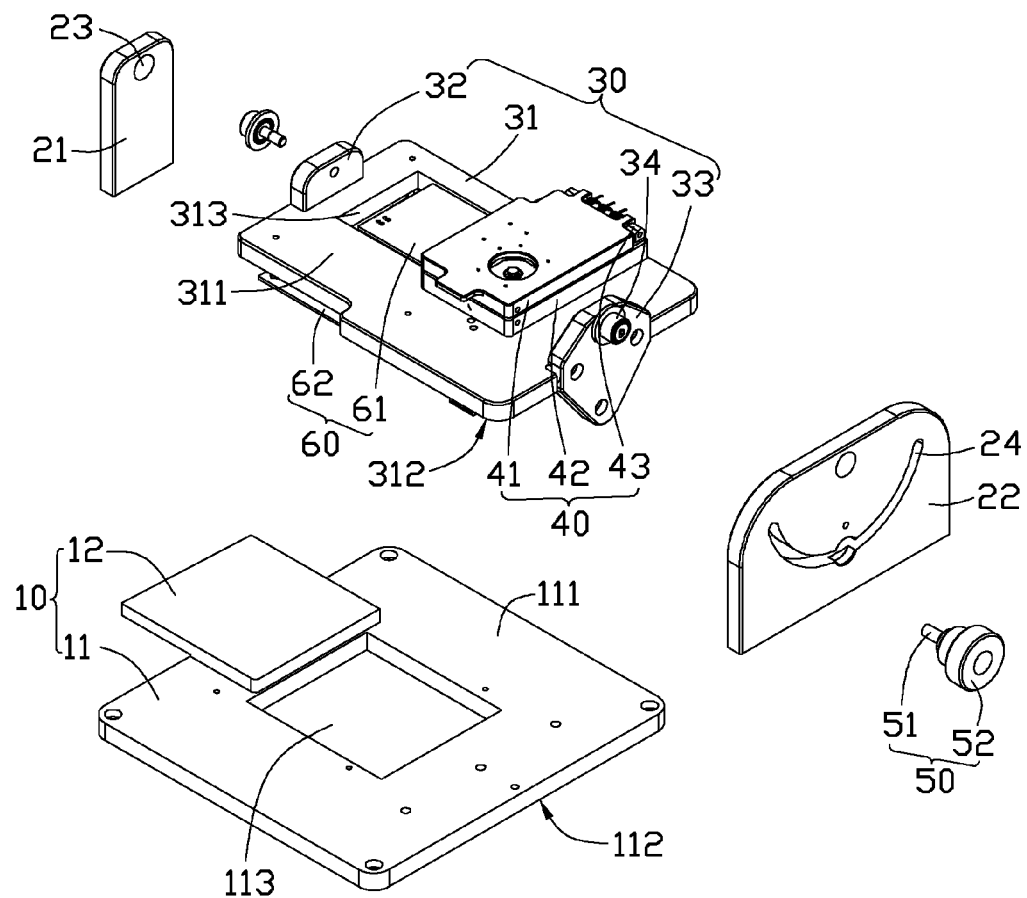
FIG. 2 is an isometric, exploded view of the lens module testing device of FIG. 1.
Figure 3:
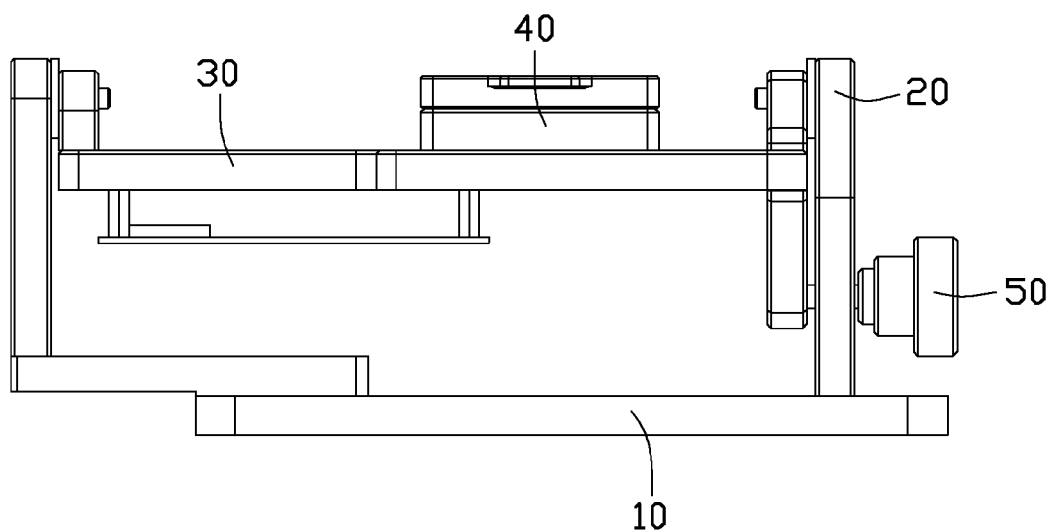
FIG. 3 is a front view of the lens module testing device of FIG. 1.
Figure 4:
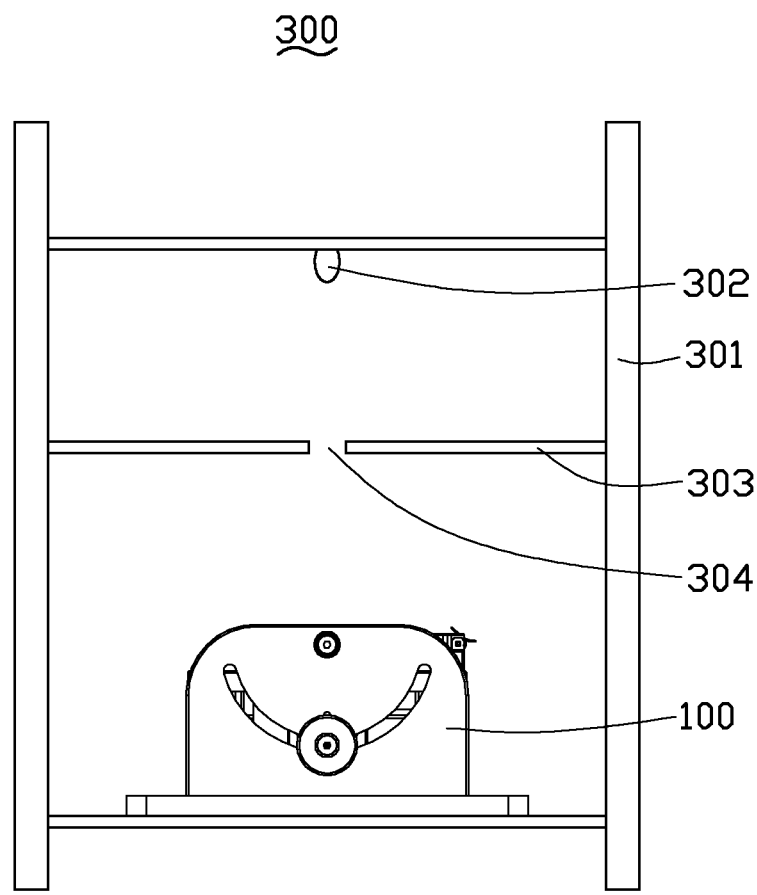
FIG. 4 shows the lens module testing device of FIG. 1 in a state of testing a lens module.

Referring to FIGS. 1-3, a lens module testing device 100, according to an exemplary embodiment, supports a lens module 200. The lens module testing device 100 includes a base substrate 10, a supporting assembly 20, a bearing assembly 30, a receiving element 40, an operation element 50, and an electrical assembly 60.

The base substrate 10 includes a bottom plate 11 and a connection plate 12 connected to the bottom plate 11. The bottom plate 11 includes an upper surface 111 and a lower surface 112 opposite to the upper surface 111. The bottom plate 11 defines a position hole 113 penetrating the upper surface 111 and the lower surface 112, generally adjacent to a center thereof. The connection plate 12 is positioned on the upper surface 111 of the bottom plate 11, and a part of the connection plate 12 extends beyond an edge of the bottom plate 11.

The supporting assembly 20 includes a left supporting plate 21 and a right supporting plate 22. The left supporting plate 21 is perpendicularly positioned on the connection plate 12, and the right supporting plate 22 is perpendicularly positioned on the bottom plate 11. The left supporting plate 21 is parallel to the right supporting plate 22, and the position hole 113 is located between the left supporting plate 21 and the right supporting plate 22. Each of the left supporting plate 21 and the right supporting plate 22 defines a shaft hole 23. The one shaft hole 23 is coaxial with the other shaft hole 23. The right supporting plate 22 defines a slot 24, and shape of the slot 24 substantially describes an arc of a circle which is centered on the central axis of the shaft hole 23. The right supporting plate 22 displays markings on an outer surface facing away the left supporting plate 21 along an edge of the slot 24.

The bearing assembly 30 includes a bearing plate 31, a left arm 32, a right arm 33, and two shafts 34. The bearing plate 31 includes a top surface 311 and a bottom surface 312 opposite to the top surface 311. The bearing plate 31 defines a receiving hole 313 penetrating the top surface 311 and the bottom surface 312. The left arm 32 is positioned on the top surface 311, generally adjacent to one edge of the bearing plate 31. The right arm 33 is attached on another edge of the bearing plate 31 and opposite to the left arm 32. The right arm 33 is parallel to the left arm 32, and protrudes from the top surface 311 and the bottom surface 312. One end of one of the shafts 34 is perpendicularly connected to the left arm 32, and one end of another shaft 34 is perpendicularly connected to a part of the right arm 33 protruding from the top surface 311. One shaft 34 is coaxial with the other shaft 34.

The receiving element 40 is configured for receiving the lens module 200, and includes an upper cover 41, a lower cover 42, and a connecting shaft 43. One end of the upper cover 41 is rotatably connected to one end of the lower cover 42 through the connecting shaft 43. The lower cover 42 is positioned on the top surface 311 of the bearing plate 31. An extending direction of the connecting shaft 43 is parallel with that of the shafts 34. In this embodiment, the lower cover 41 defines a recess (not shown) for receiving the lens module 200, and the upper cover 42 defines a through hole (not labeled). The lens module 200 received between the lower cover 41 and the upper cover 42 captures light passing through the through hole of the upper cover 42.

The operation element 50 includes a guiding pole 51 and an adjusting knob 52 connected to one end of the guiding pole 51. The diameter of the guiding pole 51 is less than the internal width of the slot 24, and the diameter of the adjusting knob 52 is greater than the internal width of the slot 24.

The electrical assembly 60 includes a circuit connecting plate 61 and a testing plate 62 connected to the circuit connecting plate 61. The circuit connecting plate 61 is received in the receiving hole 313 of the bearing plate 31, and the testing plate 62 is assembled on a bottom surface 312 of the bearing plate 31. The circuit connecting plate 61 is electrically connected to the lens module 200 when the lens module 200 is received in the receiving element 40. The circuit connecting plate 61 is designed according to the types of the lens module 200 to be tested. The testing plate 62 is a standard circuit and/or program used for testing image quality of the lens module 200.

During assembly, the receiving element 40 and the electrical assembly 60 are positioned on the bearing plate 31. The shafts 34 of the left arm 32 and the right arm 33 are received in the shaft holes 23 on the left supporting plate 21 and the right supporting plate 22. The guiding pole 51 of the operation element 50 protrudes from the slot 24, and is fixed to a part of the right arm 33 protruding from the bottom surface 312.

The shaft holes 23 can be defined on the left arm 32 and the right arm 33, and the shafts 34 can be positioned on the left supporting plate 21 and the right supporting plate 22. The left arm 32 and the right arm 33 can be rotatably connected to the left supporting plate 21 and the right supporting plate 22 by other structures, such as a guiding recess and a protrusion.

Before testing, the lens module testing device 100 is placed in a light box 300. The light box 300 includes a case 301, a light source 302, and a separating plate 303. The light source 302 is received in the light box 300 and assembled on the top of the light box 300. The lens module testing device 100 is received in the light box 300 and placed on the bottom of the light box 300. The separating plate 303 is fixed in the light box 300, and separates the light source 302 from the lens module testing device 100. The separating plate 303 defines a light hole 304, generally at a center thereof. The diameter of the light hole 304 is about 10 mm. In order to ensure that the central axis of the lens module 200, the light hole 304, and the light source 302 are aligned, a position block corresponding to the position hole 113 protrudes from the bottom of the case 301.

During testing, an operator moves the adjusting knob 52 along the slot 24 according to the markings displayed on the right supporting plate 22. The lens module 200 received in the receiving element 40 accordingly rotates. The lens module 200 is rotated to a number of different angles in relation to the light source 302, and the lens module 200 captures light at each angle. The circuit of the testing plate 62 analyses the images of the light and determines whether or not there is a flare in the images.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module testing device, comprising:
   a base substrate;
   a supporting assembly comprising two supporting plates parallel with each other and positioned on the base substrate; one of the supporting plates defining an arc shaped slot;
   a bearing assembly rotatably received between the two supporting plates;
   a receiving element positioned on the bearing assembly and configured for receiving a lens module; and
   an operation element penetrating the slot and connecting to the bearing assembly; the bearing assembly configured to be driven by the operation element to rotate along the slot.

2. The lens module testing device of claim 1, wherein the two supporting plates are a left supporting plate and a right supporting plate, the left supporting plate and the right supporting plate are perpendicularly positioned on the base substrate, and the right supporting plate defines the slot.

3. The lens module testing device of claim 2, wherein each of the left supporting plate and the right supporting plate defines a shaft hole, the bearing assembly comprises two shafts positioned at two sides thereof, and each of the shafts are received in the respective shaft hole.

4. The lens module testing device of claim 3, wherein the bearing assembly comprises a bearing plate, a left arm, and a right arm; the left arm and the right ram are parallelly positioned on the bearing plate, generally adjacent two opposite edges thereof.

5. The lens module testing device of claim 4, wherein the bearing plate comprises a top surface and a bottom surface opposite to the top surface, the left arm is positioned on the top surface close to an edge of the bearing plate, the right arm is attached on another edge of the bearing plate and opposite to the left arm, the right arm protrudes from the top surface and the bottom surface.

6. The lens module testing device of claim 5, wherein one end of one of the shafts is perpendicularly connected to the left arm, one end of another shaft is perpendicularly connected to a part of the right arm protruding from the top surface.

7. The lens module testing device of claim 6, wherein the slot is centered on a central axis of the shaft holes, and the operation element is fixed on another part of the right arm protruding from the bottom surface.

8. The lens module testing device of claim 7, wherein the operation element comprises a guiding pole and an adjusting knob connected to one end of the guiding pole; a diameter of the guiding pole is less than an internal width of the slot, and a diameter of the adjusting knob is greater than the internal width of the slot; the guiding pole passes through the slot and is fixed on the part of the right arm protruding from the bottom surface; the adjusting knob is positioned close to an outer surface of the right supporting plate.

9. The lens module testing device of claim 1, wherein the base substrate comprises a bottom plate and a connection plate positioned on an upper surface of the bottom plate; one of the supporting plate is perpendicularly positioned on the connection plate, and another supporting plate is perpendicularly positioned on the bottom plate.

10. The lens module testing device of claim 1, further comprising an electrical assembly electrically connected to the lens module when the lens module is received in the receiving element.

* * * * *